E. C. POOL.
WEIGHING SCALE.
APPLICATION FILED APR. 7, 1914.
1,249,487.
Patented Dec. 11, 1917.
4 SHEETS—SHEET 1.
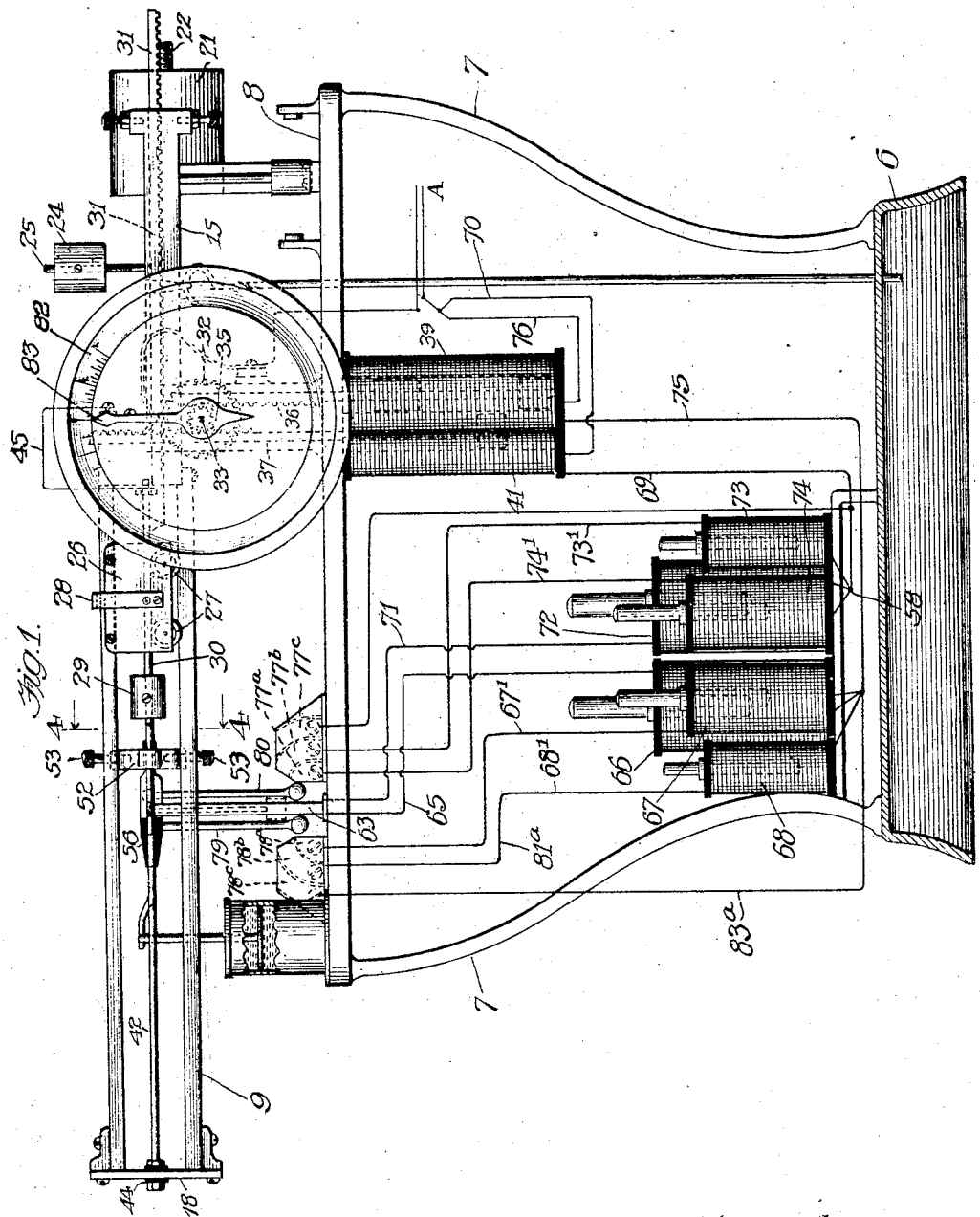
Witnesses
Martin H. Olsen.
Robert Dobberna
Inventor
Elmer C. Pool
By Rector, Hibben, Davis & Macauley
His Att'ys

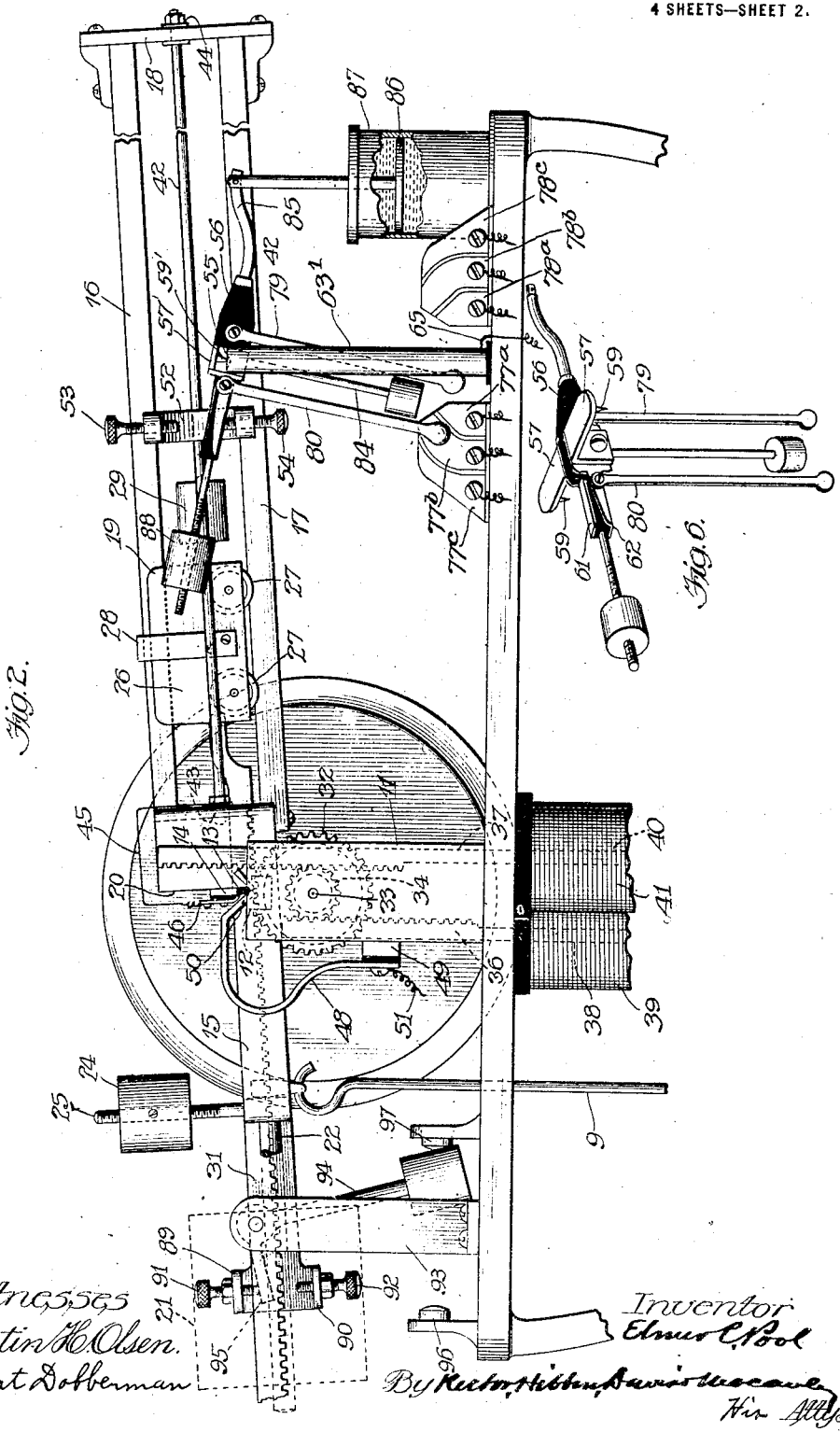

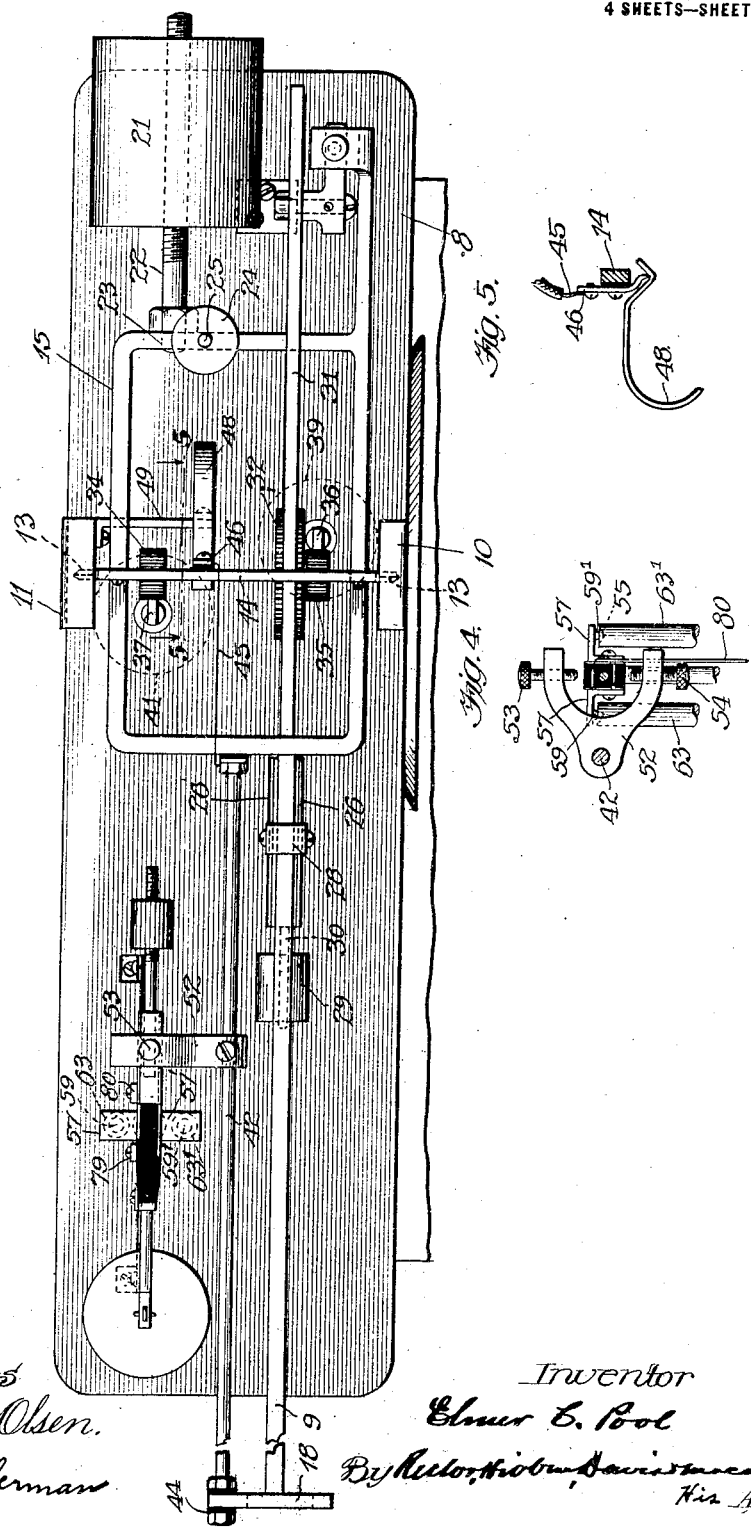

E. C. POOL.
WEIGHING SCALE.
APPLICATION FILED APR. 7, 1914.
1,249,487.
Patented Dec. 11, 1917.
4 SHEETS—SHEET 4.
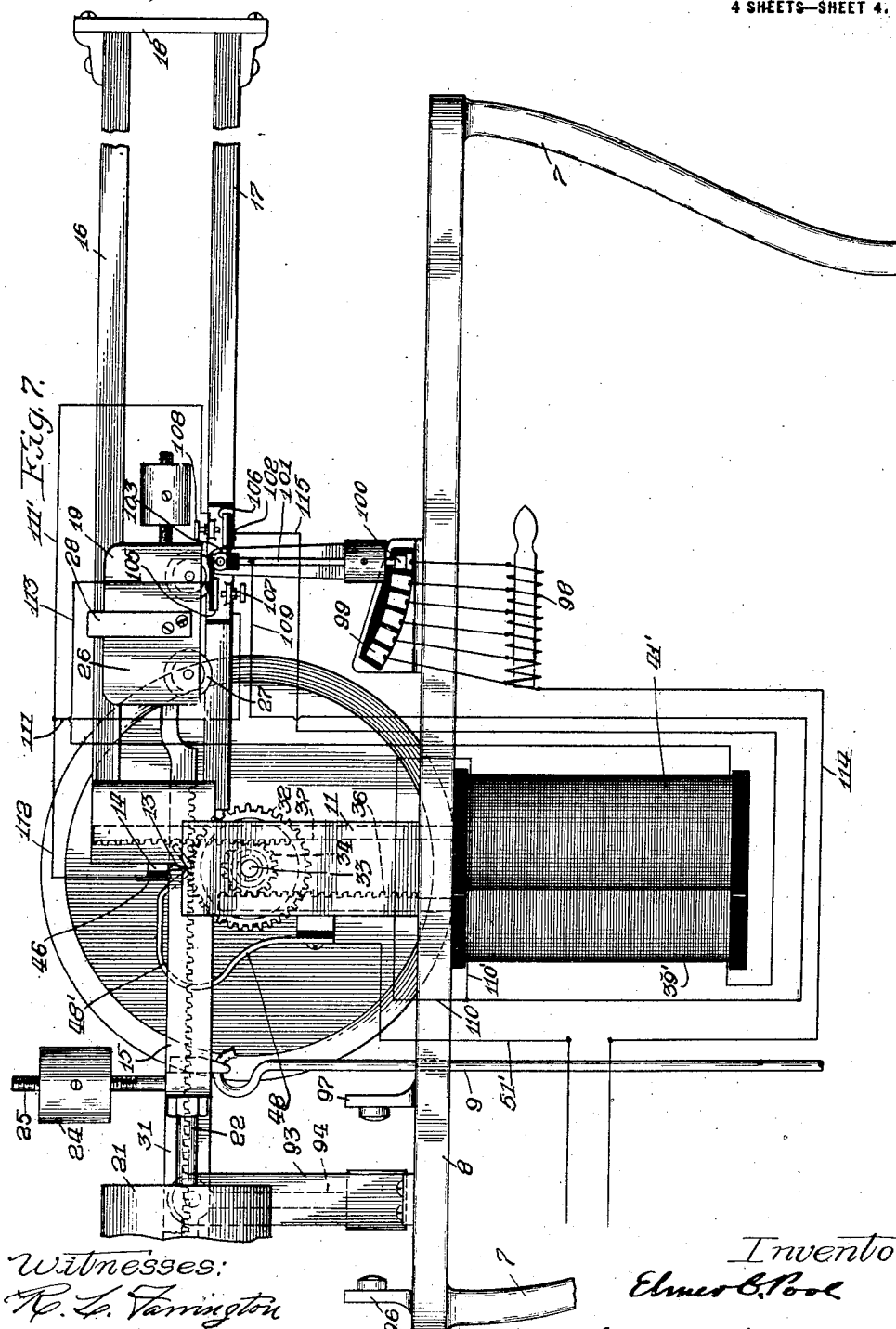
Witnesses:
R. L. Farrington
Robert Dobberman
Inventor
Elmer C. Pool
By Rector, Hibben, Davis & Macauley
His Attys

UNITED STATES PATENT OFFICE.

ELMER C. POOL, OF NEW CASTLE, PENNSYLVANIA, ASSIGNOR TO TOLEDO SCALE COMPANY, OF JERSEY CITY, NEW JERSEY, A CORPORATION OF NEW JERSEY.

WEIGHING-SCALE.

1,249,487.   Specification of Letters Patent.   Patented Dec. 11, 1917.

Application filed April 7, 1914. Serial No. 830,272.

*To all whom it may concern:*

Be it known that I, ELMER C. POOL, a citizen of the United States, residing at New Castle, in the county of Lawrence and State of Pennsylvania, have invented certain new and useful Improvements in Weighing-Scales, of which the following is a specification.

My invention relates more particularly to a beam scale having a poise which is automatically fed outward along the beam upon the placing of a load upon the scale platform and adjusted back and forth until equilibrium is reëstablished. The automatic operation of the scale is accomplished by electromagnetic means, circuits being closed when the beam is in any but a middle position through electromagnetic devices which govern the position of the poise and tend to restore the beam to such central position. The entire operation of the scale is automatic and because of the character of the means for adjusting the poise any required amount of power may be used in any position of the scale beam to feed the poise into a position in which the scale is in exact equilibrium so that the friction and weight of the parts cut little or no figure in the accuracy of the scale. Furthermore, by reason of the fact that the effect of friction is substantially eliminated in my scale the delicacy of the indicating mechanism, which must ordinarily be employed to avoid interfering with the accuracy of the scale, is done away with and indicating mechanism may be used involving systems of gearing or other mechanism which cannot be employed where the indicator must be driven directly by a delicately balanced beam. Other features of novelty and advantage will be pointed out in the following specification in which I have described in detail preferred forms of my invention. It is to be understood, however, that the disclosure of specific forms of my scale is for the purpose of exemplification only, and that the scope of the invention is defined in the following claims in which I have endeavored to distinguish it from the prior art so far as known to me without, however, relinquishing or abandoning any portion thereof.

In the accompanying drawings the invention is disclosed as applied to a platform scale which may be of any ordinary character and therefore the platform and system of leverage which are employed in connection therewith are not illustrated or described. Figure 1 is a vertical cross section through the base of a scale of this character; Fig. 2 is an enlarged detail of the same partially broken away, shown in elevation and viewing the opposite side of the scale from that shown in Fig. 1; Fig. 3 is a plan showing substantially the parts shown in Figs. 1 and 2, the remainder of the scale being shown as broken away; Fig. 4 is a vertical section upon the line 4—4 of Fig. 1 looking in the direction of the arrows and upon a somewhat enlarged scale; Fig. 5 is a vertical section upon the plane of the line 5—5 of Fig. 3; also looking in the direction of the arrows; Fig. 6 is a perspective of a detail, and Fig. 7 represents in elevation a modified form of the invention. The same character of reference is applied to each part wherever it occurs in the several views.

The base 6 of the scale is shown as of cast metal as usual and is provided with a pair of brackets or supports 7, 7 at one end of the base support and a shelf 8, which carries the beam and associated parts. A pair of uprights 10, 11 are mounted upon the shelf and carry at their upper ends bearing blocks 12 (see dotted lines Fig. 2) upon which the fulcrum knives 13 of the beam rest. The latter comprises a cast hollow frame 15 (see Fig. 3) to the forward face of which are screwed or otherwise secured upper and lower guide bars 16, 17, connected at their outer ends by the plate 18 and forming supports and guides for the poise carriage 19. The latter will be again referred to at a later portion of the specification. The rectangular frame 15 is cut away at its rear portion so that the opposite longitudinal members thereof furnish shoulders 20 to which the transverse bar 14, alluded to above as carrying the fulcrum knives, is screwed or otherwise secured. A counterweight 21 for sealing the scale is adjustable upon a screw rod 22 secured at 23 to the rectangular frame and a second counterweight 24 adjustable upon a screw 25 extending upwardly from the frame assists in securing the proper weight distribution of the beam system as a whole with reference to its fulcrum. In Fig. 2 the screw rod 22 is shown as broken away and the counterweight in broken lines, in order to show other parts which otherwise might be concealed thereby. The link or steelyard by which the beam is connected to the leverage system supporting the platform of the scale is shown at 9.

The adjustable poise carriage 19 comprises a pair of side plates 26, 26 between which are journaled anti-friction rollers 27, 27, which run upon the guide bar 17 and support the weight of the poise and carriage, and the latter is maintained in its vertical position by means of a metal strip or loop 28 extending over the upper guide bar 16. The poise carriage supports poise 29 which is adjustably secured to a rod 30 projecting from the forward end of the carriage and it will be understood that the poise carriage and poise are readily movable backward and forward longitudinally of the guide bars 16 and 17. In order to feed the carriage in opposite directions a rack bar 31 is secured thereto and extends rearwardly over a gear 32 mounted on a shaft 33 journaled in the uprights 10, 11 referred to above. The bearings of the shaft are so located in view of the size of the gear that the circumference of the latter passes substantially through the axis of the fulcrum bearing of the beam and the rack 31 rests upon the gear at this point, by reason of which it will be seen that the swinging of the beam and the operation of the gear and rack are unaffected by each other except in so far as the shifting of the poise controls the movement of the beam. Said shaft of the gear 32 also carries on opposite sides of the latter pinions 34, 35, which are engaged by vertically reciprocating racks 36, 37, the function of which is to turn the shaft in opposite directions and thereby through the medium of gear 32 and rack 31 shift the poise. The rack 36 is carried by the core 38 of a solenoid 39 and rack 37 is similarly carried by the core 40 of solenoid 41 and when either solenoid is energized it draws upon the corresponding rack and rotates the shaft controlling the position of the poise, it being understood that the other solenoid is deënergized at the time by reason of certain connections which will be described later. The solenoid cores are preferably tapered in a manner to secure a long even stroke.

The circuits through the solenoids are controlled by a switch operated directly by the scale beam which carries two of the four contact members thereof. In connection with the switch for diverting the flow of current through one or the other of the solenoids accordingly as the poise is to be shifted in or out along the beam to restore equilibrium, I provide a rheostat which controls the strength of the actuating electrical impulse according to the distance to be traversed by the poise. Thus, whenever the vibrations of the beam are of considerable amplitude as when the load is first put upon the scale platform or pan the rheostat permits comparatively strong impulses to be given the poise in whichever direction it is to be driven so that a position of approximate equilibrium is rapidly attained, but as the poise approaches the position of accurate equilibrium and the amplitude of the vibrations of the beam become less, the rheostat cuts in greater resistance into the circuits of the solenoids so that the impulses are feebler and the distances that the poise is moved become correspondingly less. The construction of the switch and rheostat contacts are best shown in Fig. 2 but the connections thereof to the resistance coils and solenoids are better illustrated in Fig. 1. Upon the beam of the scale and parallel to the guide bars 16 and 17 is mounted a conductor bar 42 which is insulated from the body of the beam at 43, 44, and electrically connected by a wire 45 to a contact plate 46 mounted upon but insulated from the transverse knife bar 14 and formed with a knife edge in the line of the axis of the beam fulcrum. A spring contact member 48 is attached to but insulated from a bracket 49 upon the standards 11 and bent near its free end as at 50 to form a seat for contact plate 46. A leading-in wire 51 connects the spring contact 48 to service or to a connection socket. Upon the conducting rod 42 is mounted a bracket 52 which is also in electrical contact therewith and carries a pair of contact screws 53 and 54. Thus at all times there is electrical continuity from service through wire 51, spring 48, contact plate 46, wire 45, rod 42 and contacts 53 and 54. When the beam is in its position of equilibrium and substantially horizontal, however, the circuit is broken at these contacts for they are in spaced relation to the walking beam 55 which carries the coacting contacts. The beam in question is shown in detail in Fig. 6. It is provided with a pendulum 84 to yieldingly maintain it in an intermediate position and comprises a central body portion 56 of insulating material upon opposite sides of which are screwed brackets 57—57', each of which carries a downwardly-extending cone pivot 59—59'. Upon the upper face of the block of insulating material is mounted a contact plate 61 which is in electrical connection as shown in Fig. 6 with the bracket 57 carrying the pivot 59 and upon the under side of the insulating member is mounted a contact plate 62 which is in like manner in electrical connection with the bracket 57' carrying pivot 59'. The cone pivots above referred to are of conducting material and engage concave seats in metal posts 63, 63', which are mounted upon but insulated from the shelf 8. The post 63 (see Fig. 2) is connected by wire 65 with a resistance or choke coil 66 which is connected by branch 66' and wire 75 to solenoid 39, the other terminal of which is connected by wire 76 to service at A. The other post 63' is similarly connected by wire 71 to resistance or choke coil 72, which is connected by branch 72' and wire 69 with solenoid 41 and so through wire 70 to service at A. Thus each of the contact plates 61, 62 on the walking beam is separately connected through a pivot of the beam, the post on which it rests, a resistance or choke coil and a solenoid coil to service, it being understood of course that choke coils are only used for alternating currents, ohmic resistances being used with direct current. With the connections thus far described whenever a load is placed upon the scale it moves the beam to bring the lower contact screw 54 into engagement with the corresponding plate upon the lower side of the arm 55, which arm is carried with it by the scale beam, thus maintaining the contacts closed. A current passes from service through the beam and the connections just described, and through the solenoid 41, which thereupon draws down its core and through the mechanical connections described feeds the poise 19 outward along the beam until the weight upon the platform is counterbalanced. If the movement of the poise is just sufficient to reëstablish equilibrium the beam is moved into intermediate position where the circuit is broken and the weight of the commodity may then be read. Ordinarily, however, unless provision is made to the contrary, there is some overthrow of the poise so that the beam is carried down until the contact screw 53 engages the contact plate upon the upper side of the arm 55, whereupon a current is again established but this time through the other solenoid coil 39 which thereupon attracts its core and through the intermediate mechanical connections described retracts the poise toward the fulcrum of the beam. The resistance of the coils 66, 72 is such that the current passing therethrough only feebly energizes the solenoids so that the movements of the poise are correspondingly slow to minimize the tendency of the same to overthrow. In order to provide for a more rapid movement of the poise when it is more remote from the position of equilibrium I provide the following connections whereby a strength of current roughly proportional to the distance through which the poise must be fed is furnished to the proper solenoid. A pair of contact fingers 79, 80 is carried by the walking beam, contact finger 79 being in electrical connection with the upper contact plate 61 upon said arm and finger 80 being in electrical connection with the lower contact plate 62. A pair of sets of stationary contacts is arranged upon opposite sides of the normal position of the pendulum and contact fingers, with one of which sets the members of which are identified by the numerals $77^a$, $77^b$ and $77^c$, the finger 80 coöperates, and with the other set marked $78^a$, $78^b$ and $78^c$ the other finger 79 coöperates. Each of these stationary contacts constitutes part of a distinct electric circuit, the circuits appertaining to contacts marked $78^a$, $78^b$ and $78^c$ being connected in parallel to each other and in series to the solenoid 39, while the contacts $77^a$, $77^b$ and $77^c$ are similarly connected to the solenoid 41. The resistances of these circuits are graded decreasing from the inner contacts to the outer contacts. Thus the circuit of the inner contacts $77^a$, and $78^a$ contain the resistance coils 74 and 67 respectively, the circuits of the contacts $77^b$ and $78^b$ contain the smaller resistances 73 and 68 respectively and the circuits appertaining to the outer contacts $77^c$ and $78^c$ are without inserted resistance. Contact $77^a$ is connected to coil 74 by wire 74', contact $77^b$ is connected to coil 73 by wire 73' and both said coils together with the coil 72 referred to above, and the contact $77^c$ are connected to the wire 69 which leads to the solenoid 41. Similarly contact $78^a$ is connected by wire 67' to coil 67, and contact $78^b$ by wire 68' to coil 68, and both said coils as well as coil 66 heretofore mentioned and contact $78^c$ are connected by wires to conductor 75 leading to solenoid 39. Solenoids 39 and 41 are connected by conductors 76 and 70 respectively to an outlet or connection socket at A.

With the above described construction if contact is made between the scale beam and the walking beam without materially displacing the latter a feeble current is sent through the proper solenoid as heretofore described to gently shift the poise in a direction to reëstablish equilibrium. If, however, the movement of the scale beam is greater and in consequence the walking beam is displaced to a greater extent the corresponding finger 79 or 80 moves over the corresponding series of stationary contact plates closing a circuit through each of said contact plates in turn. The circuit through the post and the coil 66 or 72 as the case may be remains unbroken until the walking beam returns to its normal position but an additional circuit is supplied by way of the contact finger and the stationary contact with which it engages, the resistance of which depends upon the extent of the displacement of the walking beam. Thus when a weight is put upon the scale platform and the scale beam raised a circuit is first closed through the lower contact on the scale beam and the contact 62 upon the walking beam, arm 57', pivot 59', post 63', wire 71, coil 72, wire 69, solenoid 41, wire 70 to service. If the load is very light the movement of the walking beam will not be great, and only the path just described will supply current to the solenoid so that the movement of the poise will be correspondingly gentle. If, however, the weight is slightly greater the finger 80 will move on to the contact 77ᵃ closing an additional circuit through said finger and contact, wire 74', coil 74 and wire 69 to the solenoid 41. The additional current will correspondingly energize the solenoid to give a more rapid and vigorous movement to the poise. If the weight placed upon the scale platform is still greater the finger 80 will be moved on to the contact 77ᵇ, thus closing a path of less resistance and permitting a correspondingly greater current to pass through the solenoid, and finally if the displacement of the walking beam reaches a maximum, a path will be closed through the contact 77ᶜ and directly therefrom through the solenoid 41, so that a maximum current will pass through the latter to cause it to give a maximum impulse to the poise. Obviously if the poise, by reason of its position correspondingly overpowers the load upon the scale platform, to lower the beam and bring the contact screw 53 into contact with the plate 61, solenoid 39 will be energized, the strength of the current flowing therethrough being regulated by the contact finger 79 and the rheostat contacts 78ᵃ, 78ᵇ and 78ᶜ. As the arc of movement of the beam diminishes so also the impulse given to the poise diminishes and the beam is quickly brought to rest with the poise in the position of equilibrium.

A dial 82 is mounted concentric with the shaft 33 and the latter extended therethrough and provided with an indicator hand 83 coöperating with the dial and indicating thereon the extent of displacement of the poise from the zero position and consequently the weight of the article upon the scale platform.

By reason of the tendency of the pendulum 84 to return to a vertical position the walking beam follows the scale beam toward the intermediate position until finally the contact screw 53 or 54, as the case may be, breaks its connection with the walking beam when the actuation of the poise ceases. In order to prevent violent operation of the walking beam it is extended as at 85 and the piston 86 of a dashpot 87 connected thereto, the dashpot operating in the usual manner. The opposite end of the walking beam carries a counterbalance weight 88.

In order to further control and damp the vibration of the beam I form the shorter arm thereof with a pair of lateral lugs 89, 90 (see Fig. 2) through which are threaded adjustable screws 91, 92 and adjacent said lugs and upon an upright 93 I pivot a pendulum 94 having an angular arm 95 extending between said lugs. A pair of buffers 96, 97 are arranged on opposite sides of the pendulum to limit its movement. Obviously by suitable adjusting screws 91, 92 the beam may be permitted a proper amplitude of vibration before it is affected by the pendulum 94 but when either of the adjusting screws 91 or 92 comes in contact with the arm 95 the weight of the pendulum resists and cushions further movement of the beam to return it to an intermediate position.

Turning to the modification shown in Fig. 7 the most salient distinction between the same and the modification above described is that instead of employing rheostats or series of coils for each solenoid circuit a single rheostat coöperates with whichever solenoid is in circuit. The frame, solenoids, beam, poise and indicator of this second modification are or may be identical with those of the scale described above. A single rheostat 98 is used, however, and is shown diagrammatically as of the choke coil type. The coils of the rheostat are shown connected at suitable intervals to an arcuate row 99 of stationary contacts which are engaged by a brush or wiper 100 connected to the pendulum 101 of a walking beam 102. The walking beam in this instance is formed of a pair of arms 103, 104 of insulating material upon which are mounted contact terminals 105, 106. These terminals are adapted to be engaged respectively by contact screws 107, 108 mounted upon the beam and it is to be noted that whichever pair of contacts is engaged the walking beam and pendulum are swung in the same direction by the movement of the scale beam. The circuits closed by the pairs of contacts respectively are, however, different, contacts 105 and 107 closing a circuit through solenoid 41' by which the poise is propelled outward upon the beam and contacts 106 and 108 closing a circuit through solenoid 39' by which the poise is retracted toward the fulcrum of the beam. The brush or movable contact 100 is connected in series with each of the solenoids in any suitable manner as by the wire 109 connected to the pendulum and to the branch wires 110, 110', the pendulum of course being insulated from its support. The beam contact screws 107, 108 are connected to service by the branch wires 111, 111', wire 112, contact plate 46', spring 48', and wire 51'. Contacts 105 and 106 are connected respectively to solenoids 41' and 39'.

The operation of this form of the invention will now be readily understood. The mechanical elements operate in precisely the same manner as in the earlier described device and the operation of the electrical apparatus is very simple. When a load is put upon the scale and the outer end of the beam tilted up the contact screw 107 on the beam engages the contact 105 upon the walking beam. A circuit is thus closed from service through wire 51', spring 48', contact plate 46', wire 112, branch wire 111, screw contact 107, walking beam contact 105, wire 113, solenoid 41', branch wire 110, wire 109, pendulum 101, brush 100, one of the contacts in series 99, rheostat 98, and wire 114 to service. Normally the pendulum hangs vertically and the brush 100 rests upon that one of the contact plates of the rheostat which provides the greatest resistance so that the current sent through the solenoid 41', in case the movement of the scale beam is not sufficient to materially swing the pendulum, is the minimum and a corresponding impulse is given to the poise. If, however, the weight upon the scale is considerable or, if for any other reason, the movement of the scale beam is relatively great the walking beam is correspondingly swung and the pendulum raised to bring the brush into contact with one of the other plates of the series depending upon the extent to which the pendulum is elevated. The greater the displacement of the pendulum the more the resistance of the rheostat is cut out and consequently the larger the current flowing through the solenoid and the greater impulse given to the poise. As the beam, however, returns toward equilibrium more and more resistance is cut into the circuit of the solenoid by the brush 100 and the current correspondingly diminished. If the poise is fed outward just sufficiently to attain the position of equilibrium the scale beam will be lowered until the circuit is broken between the contacts 105 and 107. If, however, the poise is overthrown the beam descends still farther until contact is made between terminals 106 and 108. A circuit is then closed from service through connections heretofore described to the branching of conductors 111 and 111' where the current follows branch 111' to contact screw 108, thence, by contact 106, wire 115, solenoid 39', wire 110', to wire 109 and then through the connections heretofore described including the pendulum brush and rheostat to service. The solenoid 39' is thereby actuated to retract the poise, the strength of the impulse depending, as in the reverse movement heretofore described, on the extent of displacement of the pendulum 101.

If desired, the walking beam in this form of the device may also be provided with a dashpot for preventing violent motion thereof.

In either form of the invention a scale is provided in which the impulse by which the poise is returned or fed toward the position of equilibrium is regulated in degree according to the distance that it must traverse and the strength of the impulse is diminished in proportion as the poise approaches the position of equilibrium. As a result the poise is quickly and accurately adjusted to the exact position in which it will counterbalance the load upon the scale.

I claim:

1. In a weighing scale, a beam, a poise movable longitudinally thereof, an arm movable having a pendulum normally maintaining it in an intermediate position, abutments on the beam adapted to engage the arm for swinging the same, power means for shifting the poise and means operated by the arm for controlling said power means.

2. In a weighing scale and in combination with a movable part thereof, damping means including a pendulum normally disengaged from the movable part and means upon the movable part adapted to engage the pendulum to damp the vibration of the moving part.

3. In a weighing scale and in combination with a movable part thereof, damping means including a pendulum normally disengaged from and having a movement independent of said movable part and means on said movable part adapted to engage the pendulum to swing the same and thereby damp the movement of the movable part.

4. In a weighing scale having a beam, damping means including a pendulum normally disengaged from the beam, an arm on the pendulum and means on the beam adapted to engage the arm to damp the movement of the beam.

5. In a weighing scale having a beam, a pair of abutments on the beam, damping means including a pendulum normally disengaged from the beam, an arm on the pendulum extending between the abutments on the beam and adapted to be engaged thereby to check the movement of the beam.

6. In a weighing scale having a beam, damping means including a pendulum having an arm thereon normally disengaged from the beam, a pair of set screws on the beam arranged on opposite sides of the arm to form abutments therefor and adapted to engage the arm to raise the pendulum to check the movement of the beam.

7. In a weighing scale having a beam, a poise adjustable longitudinally of the beam, a rack for operating the poise, a gear journaled upon a stationary part of the scale frame for operating the rack, the point of engagement of the rack and gear being substantially in the axis of the beam fulcrum, a journal upon which the gear is mounted, a pair of pinions on the journal arranged respectively on opposite sides of the gear, racks engaging the pinions and means for operating the racks.

8. In a weighing scale having a beam and a poise adjustable longitudinally of the beam, a solenoid having a reciprocating core for operating the poise, a shifting switch controlling the circuit of said solenoid and controlled by the position of the beam.

9. In a weighing scale having a beam and a poise adjustable longitudinally thereof, a switch comprising a pivoted arm shiftable upon movement of the beam, electro-magnetic means controlled by the switch for operating the poise, and a pendulum on the switch for normally returning it to an intermediate position.

10. In a weighing scale having a beam and a poise adjustable longitudinally of the beam, a pair of solenoids having reciprocating cores for moving the poise in opposite directions respectively, a pivoted switch adapted to be engaged by the beam and operated to close the circuit through either solenoid according to the position of the beam.

11. In a weighing scale and in combination with a beam and a poise adjustable thereon, a pivoted arm, a pendulum mounted on the arm, an electric switch mounted on the arm, means upon the beam for engaging the arm to swing the same and a pair of electro-magnetic means controlled by the switch for driving the poise in opposite directions respectively.

12. In a weighing scale having a beam and a poise adjustable longitudinally thereof, a pivoted arm, contacts movable therewith, a pendulum supported upon the arm to normally retain it in an intermediate position, means on the beam for engaging the arm to swing it about its pivot, a pair of electro-magnetic means for moving the poise in opposite directions respectively and stationary contacts coöperating with said movable contacts for controlling the circuits through said electro-magnetic means.

13. In a weighing scale having a beam and a poise adjustable longitudinally thereof, an electro-magnetic means and connections operated thereby for moving the poise, a series of resistances for said electro-magnetic means, a pivoted switch, a series of stationary contacts connected respectively with said resistances, said switch having a finger adapted to move over said contacts and means upon the beam adapted to engage the switch to cause it to move over said contacts.

14. In a weighing scale having a beam and a poise adjustable longitudinally thereof, a pivoted arm, means tending to restore said arm to an intermediate position, means upon the beam for engaging said arm to move it in opposite directions, a pair of electro-magnetic means for moving the poise in opposite directions respectively, a pair of fingers on the pivoted arm and a pair of contacts with which said fingers are adapted respectively to engage, each controlling respectively the circuits through the electro-magnetic means.

15. In a weighing scale having a beam and a poise movable longitudinally thereof, a pair of electro-magnetic means for moving the poise respectively in opposite directions, a series of contacts for each electro-magnetic means, each contact also connected to a resistance element, a pivoted arm having a finger adapted to move over said contacts and means on the beam adapted to engage said arm to swing the latter.

16. In a weighing scale having a beam and a poise adjustable longitudinally of the same, a pair of electro-magnetic means, connections from each of said means to the poise for operating the same in opposite directions respectively, a set of resistances for each electro-magnetic means, a series of stationary contacts for controlling the circuit through each series of resistances and the connected electro-magnetic means, a pivoted arm having a finger adapted to engage said contacts and abutments on the beam adapted to engage said arm to control the position of said finger.

17. In a weighing scale having a beam and a poise adjustable longitudinally of the same, a pivoted arm, a pendulum secured thereto and normally maintaining it in an intermediate position, contacts on the beam adapted to engage the arm and swing it in opposite directions respectively, a pair of electro-magnetic means moving the poise in opposite directions respectively, a series of resistances for each electro-magnetic means and a pair of movable contact members secured to said arm and adapted to move respectively over said series of resistances.

18. In a weighing scale having a beam and a poise adjustable longitudinally thereof, electro-magnetic means for moving the poise longitudinally of the beam, an electric circuit including said electro-magnetic means and a part movable with the beam and an electric connection between said part and a stationary member comprising a knife edge substantially in the line of the fulcrum of the beam and a spring engaging said knife edge.

19. In a weighing machine having a beam and a poise movable longitudinally thereof, electro-magnetic means for operating the poise in opposite directions, upper and lower contacts on the beam, a pivoted arm having contacts to engage respectively said upper and lower contacts, means for normally maintaining said arm at an intermediate position and electrical connections for said electro-magnetic means comprising said contacts and arm.

20. In a weighing scale having a beam and a poise movable longitudinally thereof, an electrical connection from a stationary part of the frame to a part movable with said beam, an upper and a lower contact electrically connected to said part, an arm having means for normally returning it to an intermediate position adapted to be engaged and operated by said contacts, a set of resistances for each electro-magnetic means, a set of contacts for each set of resistances, the members whereof are connected respectively to said resistances and a pair of movable contacts on said arm adapted respectively to engage the members of the sets of contacts.

ELMER C. POOL.

Witnesses:
ANNA ZEIGLER,
GEORGE T. WEINGARTNER.

Copies of this patent may be obtained for five cents each, by addressing the "Commissioner of Patents, Washington, D. C."